(12) United States Patent
Factor et al.

(10) Patent No.: US 7,565,485 B2
(45) Date of Patent: *Jul. 21, 2009

(54) STORAGE SYSTEM WITH INHIBITION OF CACHE DESTAGING

(75) Inventors: Michael Factor, Haifa (IL); Aviad Zlotnick, Lower Galilee (IL)

(73) Assignee: International Business Machines Corporation, Armonk, NY (US)

( * ) Notice: Subject to any disclaimer, the term of this patent is extended or adjusted under 35 U.S.C. 154(b) by 6 days.

This patent is subject to a terminal disclaimer.

(21) Appl. No.: 11/933,097

(22) Filed: Oct. 31, 2007

(65) Prior Publication Data

US 2008/0071993 A1      Mar. 20, 2008

(51) Int. Cl.
*G06F 12/00* (2006.01)
(52) U.S. Cl. ........................... 711/113; 711/162
(58) Field of Classification Search ........... None
See application file for complete search history.

(56) References Cited

U.S. PATENT DOCUMENTS

| | | | | |
|---|---|---|---|---|
| 4,420,807 | A * | 12/1983 | Nolta et al. | 711/115 |
| 5,542,066 | A * | 7/1996 | Mattson et al. | 711/136 |
| 6,701,455 | B1 * | 3/2004 | Yamamoto et al. | 714/18 |
| 2004/0181639 | A1 * | 9/2004 | Jarvis et al. | 711/161 |
| 2005/0102553 | A1 * | 5/2005 | Cochran et al. | 714/6 |
| 2005/0144379 | A1 * | 6/2005 | Eschmann | 711/113 |

* cited by examiner

*Primary Examiner*—Kevin Verbrugge
(74) *Attorney, Agent, or Firm*—Vazken Alexanian

(57) ABSTRACT

Methods, apparatus and systems for data storage including initiating a destaging process in a storage system for destaging data from a cache to a mass storage device. Upon inputting a standby command to the storage system to inhibit the destaging of the data in a specified range, the destaging of the data in the specified range from the cache to the mass storage device is inhibited.

30 Claims, 5 Drawing Sheets

STORAGE SYSTEM WITH INHIBITION OF CACHE DESTAGING

FIELD OF THE INVENTION

The present invention relates generally to data storage systems, and specifically to management of a cache used in a data storage system.

BACKGROUND OF THE INVENTION

Most data storage systems include a cache memory (referred to simply as a cache), in addition to one or more mass storage devices. When the storage system receives a request to write data to a specified location, the control unit of the storage system typically places the data in the cache and immediately informs the writing entity that the write operation has been completed. The control unit then destages the data from the cache to the designated location on the target storage device in a background process. Similarly, the control unit serves read operations from the cache when possible, and stages data from the storage device to the cache only when the cache does not contain valid data for the requested location.

Data storage systems often include a concurrent copy function, which allows users to make a copy of data in a certain extent (i.e., a certain range of locations in the storage system) at a particular point-in-time. A point-in-time copy, also referred to as a concurrent copy, is a copy of the data that is consistent as of a particular point-in-time, and does not include updates to the data that occur after the point-in-time. Point-in-time copies are created for data duplication, disaster recovery, decision support, data mining and warehousing, and application development and testing. Techniques of point-in-time copying are further described in U.S. Pat. No. 6,611,901, whose disclosure is incorporated herein by reference in entirety for all purposes.

SUMMARY OF THE INVENTION

Therefore, the present invention provides techniques, apparatus and systems for controlling the destaging of data from a cache to a mass storage device in a storage system, and in particular for inhibiting background destaging of data in a specified range. There is provided, in accordance with an embodiment of the present invention, a method for data storage, including: initiating a destaging process in a storage system for destaging data from a cache to a mass storage device;

inputting a standby command to the storage system to inhibit the destaging of the data in a specified range; and inhibiting the destaging of the data in the specified range from the cache to the mass storage device responsively to the standby command.

Additionally or alternatively, the method includes inputting a dismiss command to the storage system with respect to the specified range, and discarding the data in the specified range in the cache responsively to the dismiss command.

There is also provided, in accordance with an embodiment of the present invention, apparatus for data storage. There is additionally provided, in accordance with an embodiment of the present invention, a computer software product, comprising a computer-readable medium in which program instructions are stored, which instructions, when read by a control unit of a data storage system that includes a cache and a mass storage device, cause the control unit to perform a destaging process for destaging data from the cache to the mass storage device.

BRIEF DESCRIPTION OF THE DRAWINGS

The present invention will be more fully understood from the following detailed description of the embodiments thereof, taken together with the drawings in which.

DETAILED DESCRIPTION OF THE INVENTION

Figure 1:
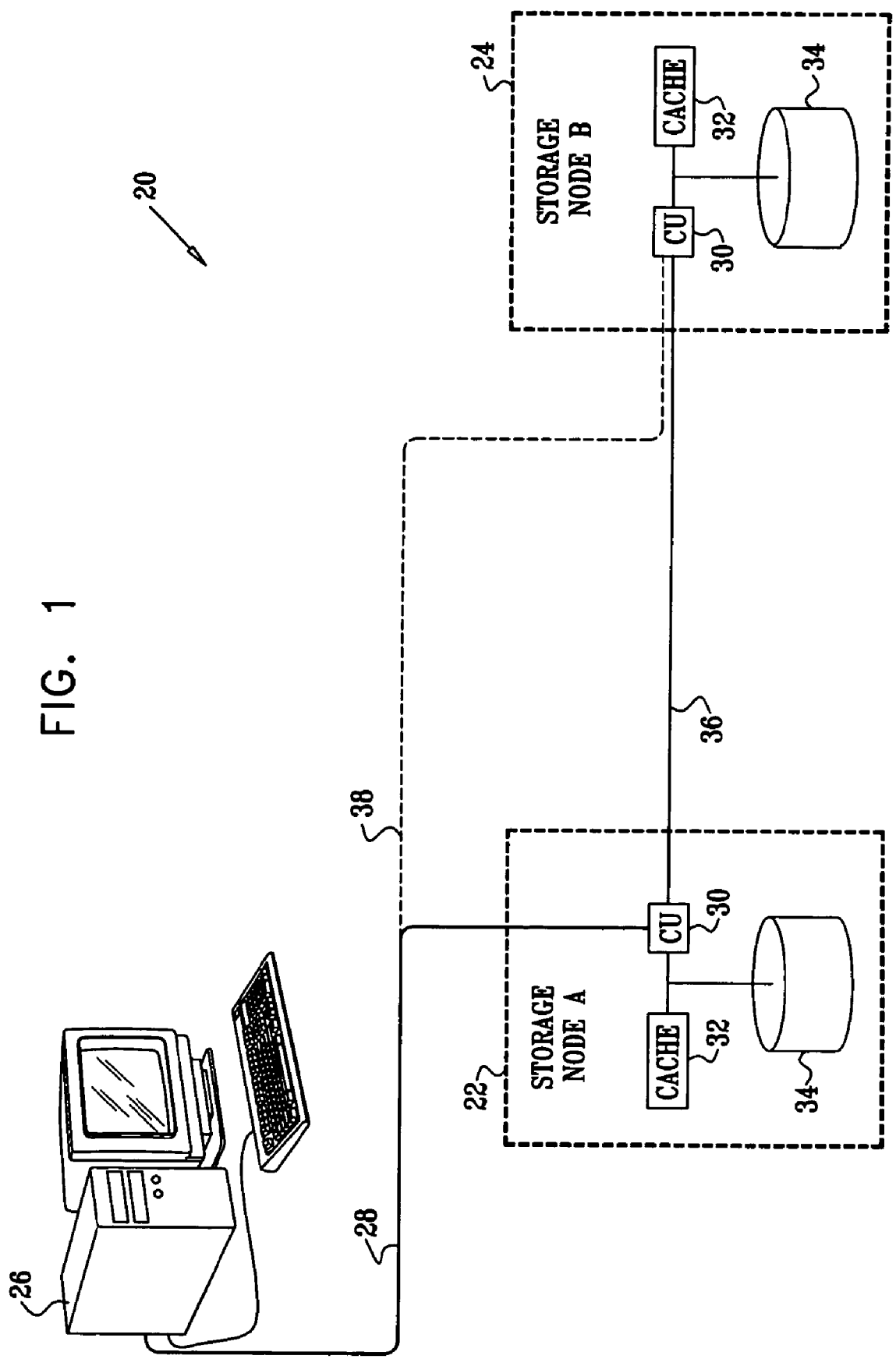
FIG. 1 is a block diagram that schematically illustrates a data storage system, in accordance with an embodiment of the present invention.

Embodiments of the present invention provide techniques for controlling the destaging of data from a cache to a mass storage device in a storage system, and in particular for inhibiting background destaging of data in a specified range. A range is typically specified in terms of an extent of locations on the storage device to which the data are to be destaged and/or the period of time during which the data in question were received by the storage system. Inhibition of destaging may be ended by a "commit" command, which instructs the storage system control unit to begin destaging the specified range; or by a "dismiss" command, which causes the storage system to discard the data in the range without destaging. These techniques provide a simple, efficient means for maintaining atomicity of storage operations and ensuring data integrity.

There is therefore provided, in accordance with an embodiment of the present invention, a method for data storage, including:

initiating a destaging process in a storage system for destaging data from a cache to a mass storage device;

inputting a standby command to the storage system to inhibit the destaging of the data in a specified range; and inhibiting the destaging of the data in the specified range from the cache to the mass storage device responsively to the standby command.

Typically, initiating the destaging process includes destaging the data from the cache to the mass storage device in a background process while servicing read and write requests submitted to the storage system. In some embodiments, destaging the data includes continuing to destage the data outside the specified range while inhibiting the destaging within the specified range.

In a disclosed embodiment, inputting the standby command includes specifying the range in which the destaging is to be inhibited in terms of at least one of an extent of locations in the storage system and a period of time of receipt of the data in the storage system.

In disclosed embodiments, the method includes inputting a commit command to the storage system with respect to the specified range, and terminating inhibition of the destaging of the data in the specified range responsively to the commit command so as to destage the data in the specified range from the cache to the mass storage device. Additionally or alternatively, the method includes receiving a request to write to a location in the specified range, and responsively to the request, if the data previously written to the location were written to the cache at a time subsequent to inputting the standby command, overwriting the data in the location in the cache, and if the data previously written to the location were written to the cache prior to inputting the standby command, writing new data to the location in the cache only after the data previously written to the location have been destaged.

Further additionally or alternatively, the method includes inputting a dismiss command to the storage system with respect to the specified range, and discarding the data in the specified range in the cache responsively to the dismiss command. In one embodiment, inputting the standby command includes inputting multiple standby commands to the storage system, the standby commands specifying multiple, respective ranges within which the destaging is to be inhibited, and inputting the dismiss command includes dismissing a plurality of the ranges, and discarding the data includes maintaining a list of invalid ranges, and removing each invalid range from the list after all the data in the invalid range have been overwritten or invalidated. In another embodiment, inputting the standby command includes specifying a point in time at which inhibition of the destaging is to begin, and the dismiss command causes the data written to the storage system since the specified point in time to be discarded from the cache so as to restore the data within at least an extent in the storage system to a state held prior to the point in time.

In a disclosed embodiment, receiving at least first and second requests to write the data to locations in the specified range while the destaging of the data is inhibited, and writing the data to the cache responsively to the first request until the cache is full, and when the cache is full, writing the data to an overflow region of the mass storage device responsively to the second request.

There is also provided, in accordance with an embodiment of the present invention, apparatus for data storage, including:

a cache;

a mass storage device; and a control unit, which is arranged to perform a destaging process for destaging data from the cache to the mass storage device, and which is coupled to receive a standby command to inhibit the destaging of the data in a specified range, and is further arranged to inhibit the destaging of the data in the specified range from the cache to the mass storage device responsively to the standby command.

There is additionally provided, in accordance with an embodiment of the present invention, a computer software product, comprising a computer-readable medium in which program instructions are stored, which instructions, when read by a control unit of a data storage system that includes a cache and a mass storage device, cause the control unit to perform a destaging process for destaging data from the cache to the mass storage device, and further cause the control unit to receive a standby command to inhibit the destaging of the data in a specified range, and to inhibit the destaging of the data in the specified range from the cache to the mass storage device responsively to the standby command.

FIG. 1 is a block diagram that schematically illustrates a data storage system 20, in accordance with an embodiment of the present invention. For the sake of convenience and conceptual clarity, aspects of the present invention are described hereinbelow with reference to the particular configuration of system 20, and to particular storage applications that may be used in system 20. It will be understood, however, that the principles of the present invention are similarly useful in other types and configurations of storage systems and in other types of storage applications.

System 20 comprises storage subsystems 22 and 24, which are labeled "storage node A" and storage node B" for convenience. In the description that follows, it is assumed that node A is configured as the primary storage subsystem, while node B is configured as the secondary storage subsystem for purposes of data mirroring. Thus, to write and read data to and from system 20, a host computer 26 (referred to alternatively simply as a "host") communicates over a communication link 28 with subsystem 22. Typically, link 28 is part of a computer network, such as a storage area network (SAN). Alternatively, host 26 may communicate with subsystem 22 over substantially any suitable type of serial or parallel communication link. Although for the sake of simplicity, only a single host is shown in FIG. 1, system 20 may serve multiple hosts.

Subsystems 22 and 24 may comprise substantially any suitable type of storage device known in the art, such as a storage server, SAN disk device or network-attached storage (NAS) device. Subsystems 22 and 24 may even comprise computer workstations, which are configured and programmed to carry out the storage functions described herein. Subsystems 22 and 24 may be collocated in a single facility or, for enhanced data security, they may be located at mutually-remote sites. Each of subsystems 22 and 24 comprises a control unit (CU) 30, typically comprising one or more microprocessors, with a cache 32 and at least one mass storage device 34. Typically, cache 32 comprises random-access memory (RAM), while device 34 comprise a magnetic disk or disk array. Alternatively, other types of cache and mass-storage media, as are known in the art, may be used to carry out the cache and storage functions of subsystems 22 and 24. Control units 30 typically carry out the operations described herein under the control of software, which may be downloaded to subsystems 22 and 24 in electronic form, over a network, for example, or may be provided, alternatively or additionally, on tangible media, such as CD-ROM, DVD or non-volatile memory.

Subsystems 22 and 24 communicate between themselves over a high-speed communication link 36, which may be part of a SAN or other network, or may alternatively be a dedicated line between the two subsystems. Subsystem 24 may also be coupled to communicate with host 26, as well as with other hosts (not shown), over a communication link 38, similar to link 28. Link 38 enables hosts to read data from subsystem 24 if desired, and also enables subsystem 24 to serve as the primary storage subsystem in the event of a failure in subsystem 22. In this case, some data may be lost.

One method to ensure data consistency, notwithstanding the data loss, is to synchronize subsystems 22 and 24 from time to time, and to make a point-in-time copy of the stored data. A bitmap may then be used to record changes since the last point-in-time copy was made, and to update the data when switching back and forth between the primary and secondary subsystems after failure and subsequent recovery. Methods of making point-in-time copies are described in the above-mentioned U.S. Pat. No. 6,611,901, as well as in United Kingdom Patent Application 0407257.5, filed Mar. 31, 2004, and in U.S. patent application Ser. No. 10/463,996, filed Jun. 17, 2003. These applications are assigned to the assignee of the present patent application, and their disclosures are incorporated herein by reference. Alternatively or additionally, embodiments of the present invention provide efficient methods, as described below, for making virtual point-in-time copies on subsystems 22 and 24, and for reverting to these copies subsequently in order to restore the data in at least an extent of system 20 to its previous state.

Maintaining data consistency based on point-in-time copy methods known in the art is effective but cumbersome. Embodiments of the present invention provide alternative methods for controlling subsystems 22 and 24, which permit data backup and failure recovery to be performed more efficiently under some circumstances. In an exemplary embodiment, a storage application operative in system 20 controls destaging from cache 32 to storage device 34 in one or both of subsystems 22 and 24 by issuing the following commands to control units 30:

"Standby"—This command specifies an extent in storage device 34, and instructs control unit 30 to inhibit destaging of data from cache 32 to device 34 for all data written to the extent beginning from the time at which the standby command is issued. (Destaging is typically carried out by a background process, as noted above.) The extent to which the standby command applies typically includes a range of locations, such as tracks, on the storage device, and may include the entire storage device. The term "range," as used in the context of the present patent application and in the claims, includes both contiguous and non-contiguous ranges, i.e., ranges that may be made up of multiple, separate sub-ranges. The standby command thus specifies a range in terms of target locations and times of writing, although it could specify only one or another of these range delimiters. The effect of the standby command is to effectively freeze the data on the storage device 34 at the time of issuing the command, since only data that were written to the cache prior to the time of the command will be destaged, while later data will remain in the cache.

"Commit"—This command instructs control unit 30 to terminate standby mode and begin destaging the data in the inhibited range. As described below, multiple standby commands may be issued in succession, each applying to a different range of locations and/or times. In this case, the commit command applies to a particular standby command (and its effective range) or to a group of standby commands.

"Dismiss"—This command instructs control unit 30 to terminate standby mode and discard the data written to the inhibited range since the standby command. Thus, data writes that were directed to the extent specified by the standby command and were received in the storage system subsequent to issuance of the standby command are effectively undone. The control unit typically accomplishes this step simply by marking the corresponding cache entries as invalid and/or by overwriting the entries.

The data structures and specific procedures used in subsystems 22 and 24 in carrying out these commands are described in detail hereinbelow.

One example of the use of the above commands is in asynchronous storage backup from subsystem 22 to subsystem 24. In this case, asynchronous remote copy write operations are grouped in batches. The storage application running on host 26 issues a standby command to control units 30 in both subsystems before each batch, and ends the batch with a commit command. If a failure occurs in subsystem 22 before completion of a given batch, the storage application issues a dismiss command to subsystem 24. Thus, the data on storage devices 34 in subsystems 22 and 24 remain consistent even in the event of a failure in one of the subsystems, without the need to maintain a separate point-in-time copy and storage bitmap.

Conversely, data backup and disaster recovery applications in system 20 may be tested by issuing a standby command before the test, so that data are written only to caches 32 during the test, and the data on storage devices 34 are unaffected. Upon conclusion of the test, a dismiss command is issued to undo all the changes created in the data (in caches 32) on subsystems 22 and 24 as a result of the test. System 20 thus reverts automatically to the state of the data stored before the test without having to copy over or restore any of the data on storage devices 34.

In other words, control unit 30 is able to create a virtual point-in-time copy of stored data without allocating any additional memory to hold the copy. This capability may be used by an application to toggle back from a newer version of data to an older one, by swapping between the newer version in cache 32 and a previous version on storage device 34. Other applications of this "virtual copying" capability and of the novel storage commands described above will be apparent to those skilled in the art and are considered to be within the scope of the present invention.

Figure 2:
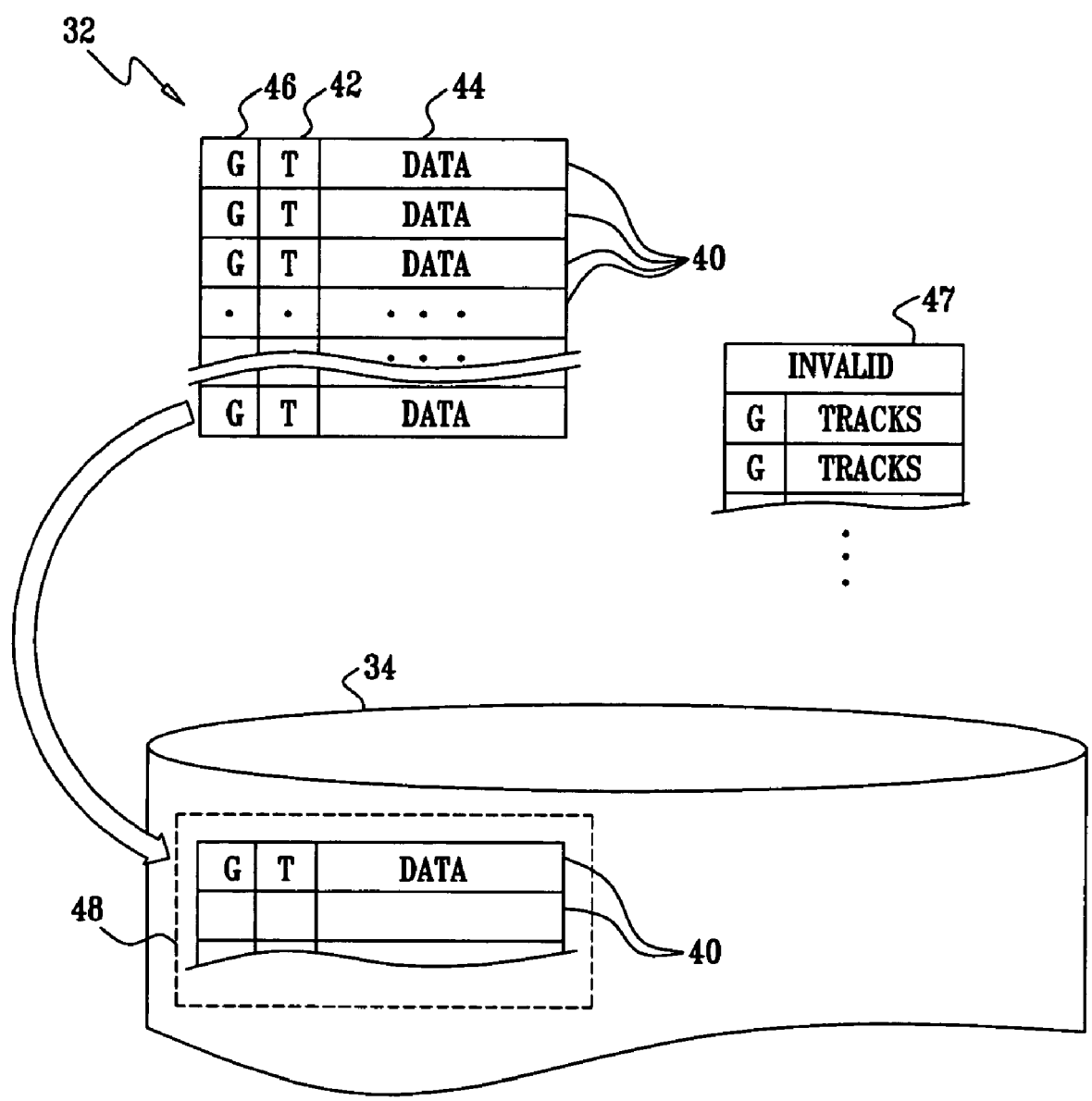
FIG. 2 is a schematic representation of data structures used in a data storage system, in accordance with an embodiment of the present invention.

FIG. 2 is a schematic representation of data structures used in subsystems 22 and 24 in an exemplary implementation of the above commands, in accordance with an embodiment of the present invention. Cache 32 comprises multiple entries 40, each of which comprises a track number 42 and data 44 belonging to the specified track. In addition, each entry 40 comprises a generation number 46. Each standby command received by control unit creates a new generation of data in the cache, which is identified by generation number 46. The use of this generation number simplifies the task of identifying the cache entries that are to be destaged or discarded following each successive commit or discard command. A similar generation mechanism is described in the above-mentioned U.K. and U.S. patent applications for purposes of point-in-time copy management, and details of that mechanism may be applied, *mutatis mutandis*, in embodiments of the present invention.

Optionally, control unit 30 may maintain an invalid list 47, indicating the numbers of the generations that have been dismissed and the extents of the dismissed generations (typically in terms of track numbers). Entries 40 having track numbers 42 that appear in list 47 are considered invalid and therefore are not destaged to storage device 34. Control unit 30 may run a background process in cache 32 to discard the invalid tracks from the cache (or simply to mark each of the tracks in the dismissed generations as invalid). After all the tracks in a given generation have been discarded, that generation number is erased from list 47. Additionally or alternatively, list 47 may comprise an entry counter for each generation number in the list, which is decremented each time one of cache entries 40 in that generation is discarded (either by the background invalidation process mentioned above or by overwriting one of the cache entries in the generation). When the counter reaches zero, the generation number is erased from list 47. Further details of the management of list 47 are described below.

If a large number of standby entries 40 are made in cache 32 before committing or dismissing the generations to which the entries belong, the cache may fill up with entries that cannot be either discarded or destaged. To deal with this eventuality, a cache overflow region 48 may be defined on storage device 34. When cache 32 is full, control unit 30 begins moving cache entries to the overflow region. (Typically, for good cache performance, the least-recently-used cache entries are moved to the overflow region in order to make room for newer entries in the cache itself.) When entries 40 in overflow region 48 are committed, they are transferred from the overflow region to the normal storage region of the storage device. The corresponding overflow entries in region 48 may then be erased.

Figure 3:
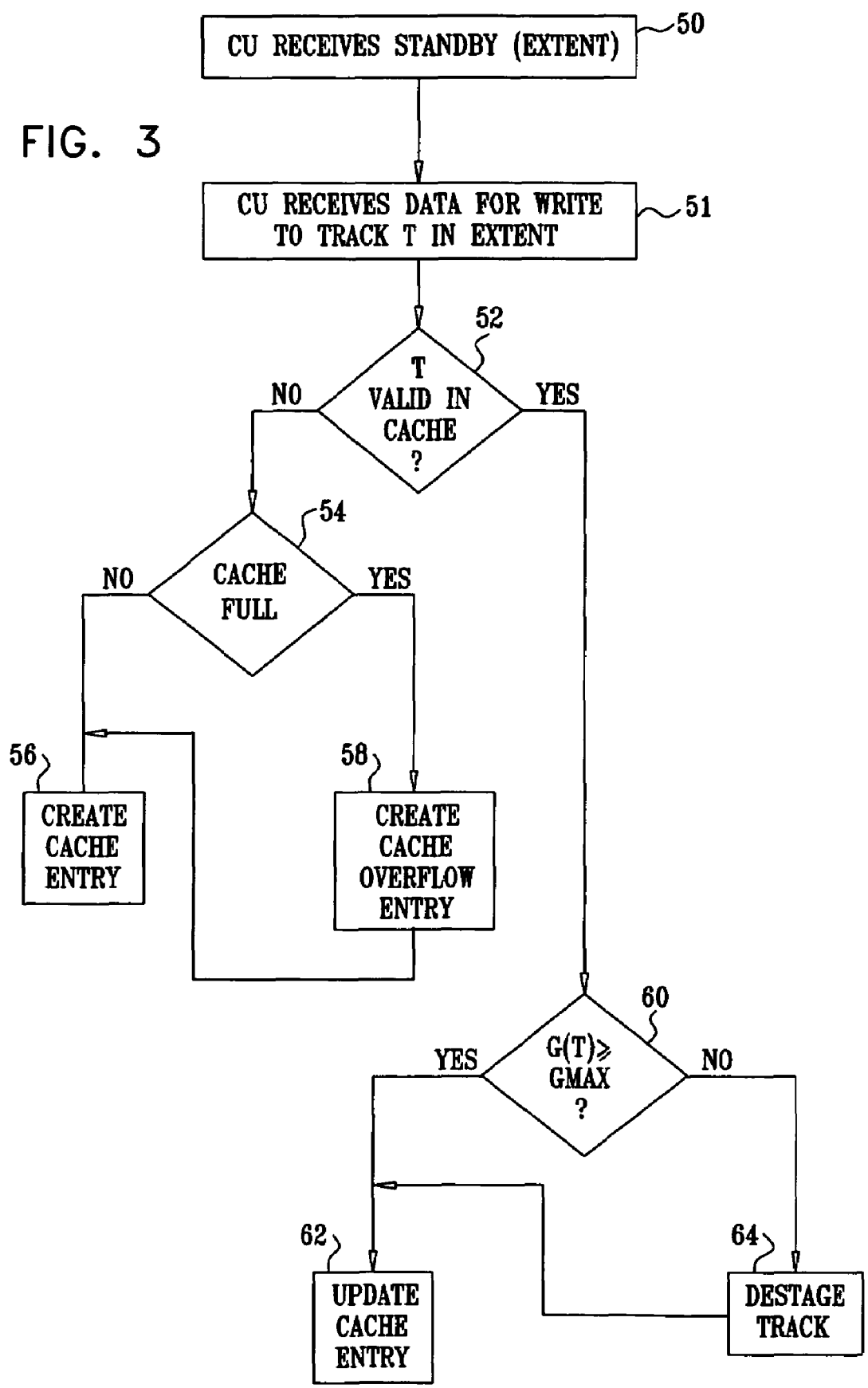
FIG. 3 is a flow chart that schematically illustrates a method for handling write requests submitted to a data storage system, in accordance with an embodiment of the present invention.

FIG. 3 is a flow chart that schematically illustrates a method for writing data to a storage system, in accordance with an embodiment of the present invention. This method, as well as those shown in the figures that follows, is described for clarity with reference to the elements of storage subsystem 22, but it is equally applicable to substantially any storage system in which the present invention is applied. The method is initiated when control unit 30 receives a standby command, at a standby step 50. Typically, the standby command is issued by a storage application, which may run on host 26, for example, and specifies the extent to which the standby applies.

After receiving the standby command, control unit 30 intercepts all write operations that are directed to locations in the specified extent, at a write interception step 51. In this example, it is assumed that a write request is directed to a track T in the standby extent in subsystem 22. The control unit checks cache 32 to determine whether the cache contains a valid entry for track T, at a validity checking step 52. If not, the control unit creates a new cache entry to hold the write data that it has received at step 51. Prior to creating the entry, the control unit checks whether the cache is full, or whether it has space for the new entry, at a cache space checking step 54. If the cache is not full (i.e., if there is cache space available), the control unit creates a new entry in cache 32, at a cache entry creation step 56. Otherwise, the control unit adds an entry in cache overflow region 48, at an overflow entry creation step 58, typically by moving an old entry from cache 32 to the overflow region. Moving the old entry out of the cache makes room to write the new entry to the cache at step 56.

As noted above, control unit 30 associates a new generation number 46 with each new standby command that it receives at step 50. Each new entry 40 that the control unit creates in cache 32 or overflow region 48 is marked with the corresponding generation number. Furthermore, if the control unit is configured to use an entry counter to keep track of the generations in invalid list 47, then each time it creates a new entry belonging to a given generation, at step 56 or 58, it increments the entry count for that generation. Thus, the entry count indicates the total number of new entries that have been created in the generation.

Control unit 30 also keeps track of a threshold generation number, GMAX, identifying the next generation that is awaiting either commitment or dismissal in each range of locations in storage subsystem 22. In other words, in any given range, all generations whose generation number G<GMAX have necessarily already been either committed or dismissed, while generations for which G≧GMAX are still on standby. Therefore, upon determining at step 52 that cache 32 contains a valid entry for the track to which the write is directed, the control unit checks generation number 46 of the corresponding entry 40 to determine whether G≧GMAX, at a generation checking step 60. If G≧GMAX, the control unit simply updates the corresponding cache entry with the new write data, at a cache update step 62. There is no need in this case to increment the generation entry counter. On the other hand, if G<GMAX for the given entry 40, control unit 30 destages the data in this entry to storage device 34, at a destaging step 64, before updating the cache entry at step 62. In this case, the generation entry counter is updated.

Figure 4A:
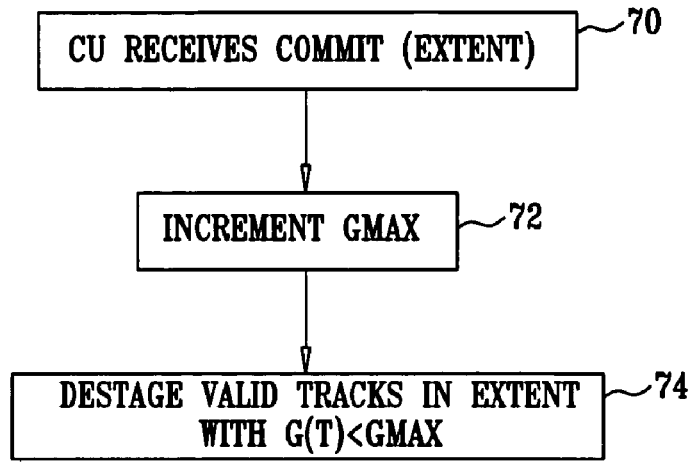
FIG. 4A is a flow chart that schematically illustrates a method for responding to a "commit" command in a data storage system, in accordance with an embodiment of the present invention.
Figure 4B:
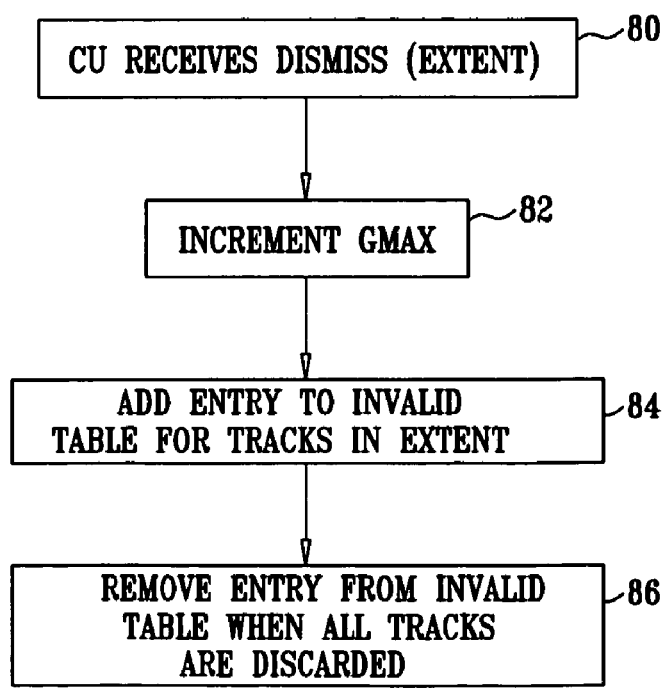
FIG. 4B is a flow chart that schematically illustrates a method for responding to a "dismiss" command in a data storage system, in accordance with an embodiment of the present invention.

FIGS. 4A and 4B are flow charts that schematically illustrate, respectively, handling of commit and dismiss commands in subsystem 22, in accordance with an embodiment of the present invention. The method of FIG. 4A is initiated when the control unit receives a commit command, at a commitment step 70. The commit command indicates the extent to which the command applies, such as the range of tracks for which data are to be destaged from cache 32 to storage device 34. Typically, the extent is specified in terms of the standby generation or generations that are to be committed.

In response to the commit command, control unit 30 increments the threshold generation number GMAX, at a threshold incrementation step 70. The control unit then proceeds to destages all tracks containing valid data for which G<GMAX, at a destaging step 74. Typically, destaging is carried out in a background process, except to the extent required by new write operations, at step 64, as described above.

The method of FIG. 4B is initiated when control unit 30 receives a dismiss command, at a dismissal step 80. Again, the dismissal applies to a given extent, typically expressed in terms of one or more standby generations. In this case, too, GMAX is incremented, at a threshold incrementation step 82. The control unit adds an entry to invalid table 47 corresponding to each generation that has been dismissed, at an invalid table update step 84. Typically, as noted above, the entry lists the tracks in the extent that has been invalidated. Alternatively or additionally, the invalid table entry contains the entry count for the generation, based on the final value incremented at step 56, 58 or 62, as described above.

Control unit 30 removes the invalidated entries 40 from cache 32 (and from overflow region 48), and then removes the generation in question from invalid list 47 when all the entries have been discarded, at a table clearing step 86. As noted above, the control unit may discard the entries in a background process. If the control unit maintains an entry count in table 47, then each time the background process removes a cache entry 40 belonging to a given dismissed generation, the control unit decrements the count for that generation. Similarly, the entry count is decremented each time the control unit overwrites a cache entry belonging to that generation. When the entry count reaches zero, the generation is removed from the invalid list.

Figure 5:
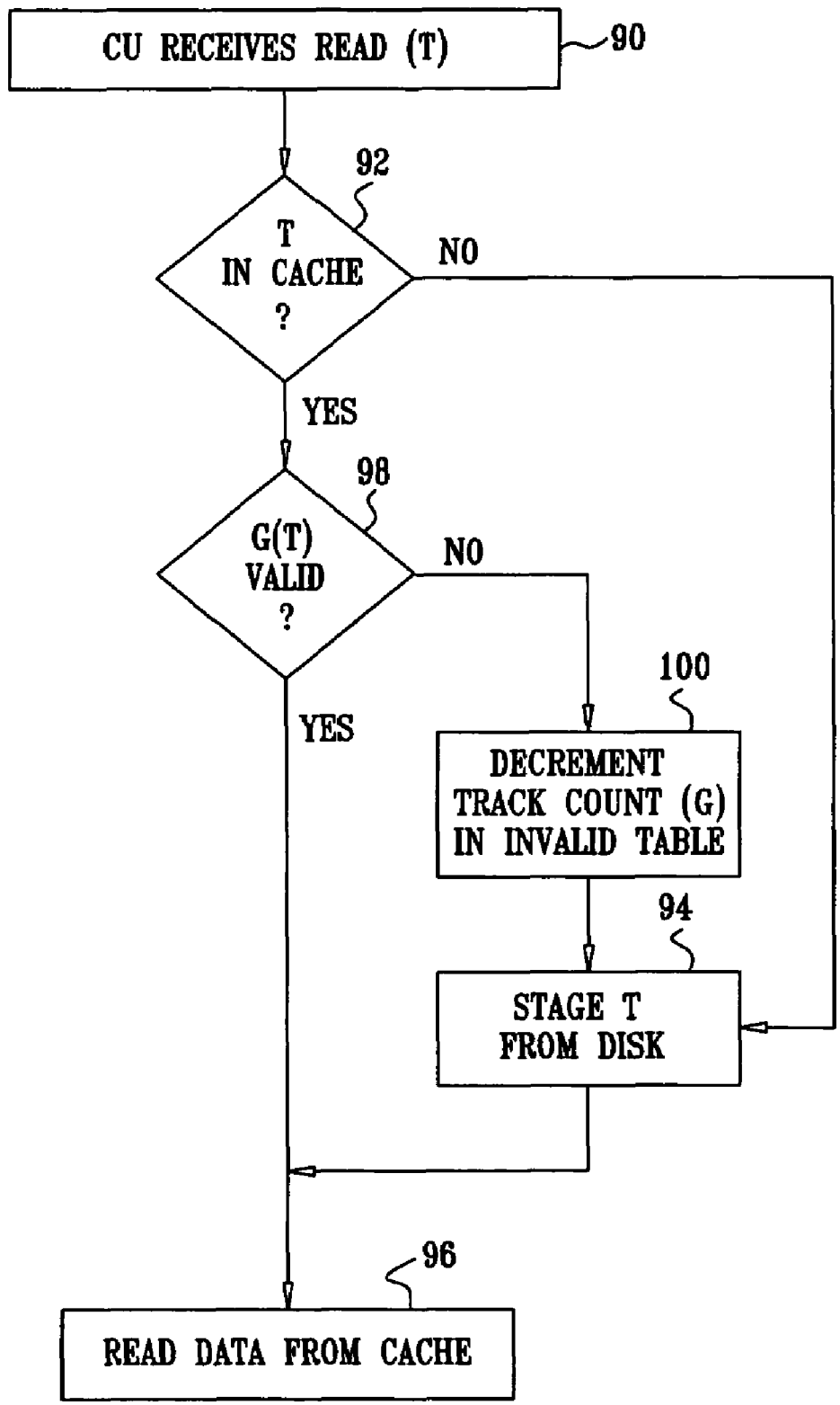
FIG. 5 is a flow chart that schematically illustrates a method for handling read requests submitted to a data storage system, in accordance with an embodiment of the present invention.

FIG. 5 is a flow chart that schematically illustrates a method for reading data from subsystem 22, in accordance with an embodiment of the present invention. This method is initiated when control unit 30 receives a request (from host 26, for example) to read data from a track T, at a read request step 90. As in a conventional storage system, the control unit checks cache 32 to determine whether the cache (including overflow region 48) contains an entry 40 for this track, at a cache checking step 92. If not, the control unit stages the requested track from storage device 34, at a staging step 94, and then reads out the data to the requesting host, at a data readout step 96.

Alternatively, if control unit 30 finds an entry 40 in cache 32 (including overflow region 48) having a track number 42 corresponding to the requested track T, it checks generation number 46 of the entry, at a generation checking step 98. The purpose of checking the generation number is to ensure that entry 40 does not belong to a generation that has been dismissed (in which case the generation number will appear in invalid list 47). If the generation is valid, i.e., either already committed or still on standby, the control unit reads out the data from the entry 40 in the cache, at step 96. (If the entry in question is in overflow region 48, the entry is typically moved to cache 32 before read-out, while another entry may be moved from the cache to the overflow region in order to make room for the requested entry in the cache.) Otherwise, if the generation G(T) appears in the invalid list, control unit 30 reads out the data from this entry 40 only after staging valid data from storage device 34 at step 94, and thus overwriting the invalid entry. Upon overwriting the invalid entry, the control unit decrements the entry count for this generation in invalid table 47, at a decrementation step 100.

Although in the embodiments described above, certain terms (such as "standby," "commit," and "dismiss") are used to denote the commands used to control the operation of system 20, these terms are merely descriptive, and are used in the specification and the claims solely for the sake of clarity. The operations invoked by these commands may similarly be invoked by commands and system functions having other names, which are also considered to be within the scope of the claims. It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

Variations described for the present invention can be realized in any combination desirable for each particular application. Thus particular limitations, and/or embodiment enhancements described herein, which may have particular advantages to the particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed, is:

1. A control method for controlling destaging of data from a cache to a mass storage device in a storage system, the step of controlling, comprising:
    a mass storage system receiving a request to write data to a specified location;
    a control unit of the mass storage system placing the data in the cache and immediately informing a writing entity that a write operation has been completed;
    initiating a destaging process in the storage system for destaging data from the cache to the mass storage device;
    inputting a standby command to the storage system to inhibit the destaging of the data in a specified range; and
    inhibiting the destaging of the data in the specified range from the cache to the mass storage device responsively to the standby command.

2. The control method according to claim 1, further comprising the control unit serving read operations from the cache, and stages data from the storage device to the cache only when the cache does not contain valid data for the requested location, and
    wherein the step of initiating the destaging process comprises destaging the data from the cache to the mass storage device in a background process while servicing read and write requests submitted to the storage system.

3. The control method according to claim 2, wherein the step of destaging the data comprises continuing to destage the data outside the specified range while inhibiting the destaging within the specified range.

4. The control method according to claim 1, wherein the step of inputting the standby command comprises specifying the range in which the destaging is to be inhibited in terms of at least one of an extent of locations in the storage system and a period of time of receipt of the data in the storage system.

5. The control method according to claim 1, further comprising:
    inputting a commit command to the storage system with respect to the specified range, and
    terminating inhibition of the destaging of the data in the specified range responsively to the commit command so as to destage the data in the specified range from the cache to the mass storage device.

6. The control method according to claim 1, further comprising receiving a request to write to a location in the specified range, and responsively to the request:
- if the data previously written to the location were written to the cache at a time subsequent to inputting the standby command, overwriting the data in the location in the cache, and
- if the data previously written to the location were written to the cache prior to inputting the standby command, writing new data to the location in the cache only after the data previously written to the location have been destaged.

7. The control method according to claim 1, further comprising:
- inputting a dismiss command to the storage system with respect to the specified range, and
- discarding the data in the specified range in the cache responsively to the dismiss command.

8. The control method according to claim 7, wherein the step of inputting the standby command comprises inputting multiple standby commands to the storage system, the standby commands specifying multiple, respective ranges within which the destaging is to be inhibited, and wherein inputting the dismiss command comprises dismissing a plurality of the ranges, and wherein the step of discarding the data comprises maintaining a list of invalid ranges, and removing each invalid range from the list after all the data in the invalid range have been overwritten or invalidated.

9. The control method according to claim 7,
- wherein inputting the standby command comprises specifying a point in time at which inhibition of the destaging is to begin, and
- wherein the dismiss command causes the data written to the storage system since a specified point in time to be discarded from the cache so as to restore the data within at least an extent in the storage system to a state held prior to the specified point in time.

10. The control method according to claim 1, and comprising receiving at least first and second requests to write the data to locations in the specified range while the destaging of the data is inhibited, and writing the data to the cache responsively to the first request until the cache is full, and when the cache is full, writing the data to an overflow region of the mass storage device responsively to the second request.

11. An apparatus for controlling destaging of data from a cache to a mass storage device in a storage system, the apparatus comprising:
- a cache;
- the storage system to receive a request to write data to a specified location;
- a mass storage device; and
- a control unit of the storage system placing the data in the cache and immediately informing a writing entity that a write operation has been completed, which is arranged to perform a destaging process for destaging data from the cache to the mass storage device, and which is coupled to receive a standby command to inhibit the destaging of the data in a specified range, and is further arranged to inhibit the destaging of the data in the specified range from the cache to the mass storage device responsively to the standby command.

12. The apparatus according to claim 11, wherein the control unit is arranged to destage the data from the cache to the mass storage device in a background process while servicing read and write requests submitted to the storage system.

13. The apparatus according to claim 12, wherein the control unit is arranged to continue to destage the data outside the specified range while inhibiting the destaging within the specified range.

14. The apparatus according to claim 11, wherein the standby command specifies the range in which the destaging is to be inhibited in terms of at least one of an extent of locations in the storage system and a period of time of receipt of the data in the storage system.

15. The apparatus according to claim 11, wherein the control unit is arranged to receive a commit command with respect to the specified range, and to terminate inhibition of the destaging of the data in the specified range responsively to the commit command so as to destage the data in the specified range from the cache to the mass storage device.

16. The apparatus according to claim 15, wherein the control unit is arranged to receive a request to write to a location in the specified range, and responsively to the request,
- if the data previously written to the location were written to the cache at a time subsequent to inputting the standby command, to overwrite the data in the location in the cache, and
- if the data previously written to the location were written to the cache prior to inputting the standby command, to write new data to the location in the cache only after the data previously written to the location have been destaged.

17. The apparatus according to claim 11, wherein the control unit is arranged to receive a dismiss command with respect to the specified range, and to discard the data in the specified range in the cache responsively to the dismiss command.

18. The apparatus according to claim 17,
- wherein the control unit is arranged to receive multiple standby commands, specifying multiple, respective ranges within which the destaging is to be inhibited, and to receive one or more dismiss commands dismissing a plurality of the ranges, and
- wherein the control unit is further arranged to maintain a list of invalid ranges, and to remove each invalid range from the list after all the data in the invalid range have been overwritten or invalidated.

19. The apparatus according to claim 17,
- wherein the standby command specifies a point in time at which inhibition of the destaging is to begin, and
- wherein the control unit is arranged, responsively to the dismiss command, to discard from the cache the data written to the storage system since the specified point in time so as to restore the data within at least an extent in the storage system to a state held prior to the point in time.

20. The apparatus according to claim 11, wherein the control unit is arranged to receive at least first and second requests:
- to write the data to locations in the specified range while the destaging of the data is inhibited,
- to write the data to the cache responsively to the first request until the cache is full, and
- when the cache is full, to write the data to an overflow region of the mass storage device responsively to the second request.

21. A computer software product, comprising a computer-readable medium in which program instructions are stored, which instructions, when read by a control unit of a data storage system that includes a cache and a mass storage device, said computer-readable medium:

to cause the control unit of the data storage system to place the data in the cache and immediately inform a writing entity that a write operation has been completed, to perform a destaging process for destaging data from the cache to the mass storage device, and further cause the control unit to receive a standby command to inhibit the destaging of the data in a specified range, and to inhibit the destaging of the data in the specified range from the cache to the mass storage device responsively to the standby command.

22. The product according to claim 21, wherein the instructions cause the control unit to destage the data from the cache to the mass storage device in a background process while servicing read and write requests submitted to the storage system.

23. The product according to claim 22, wherein the instructions cause the control unit to continue to destage the data outside the specified range while inhibiting the destaging within the specified range.

24. The product according to claim 21, wherein the standby command specifies the range in which the destaging is to be inhibited in terms of at least one of an extent of locations in the storage system and a period of time of receipt of the data in the storage system.

25. The product according to claim 21, wherein the instructions cause the control unit to receive a commit command with respect to the specified range, and to terminate inhibition of the destaging of the data in the specified range responsively to the commit command so as to destage the data in the specified range from the cache to the mass storage device.

26. The product according to claim 25, wherein the instructions cause the control unit to receive a request to write to a location in the specified range, and responsively to the request, data previously written to the location were written to the cache at a time subsequent to inputting the standby command, to overwrite the data in the location in the cache, and data previously written to the location were written to the cache prior to inputting the standby command, to write new data to the location in the cache only after the data previously written to the location have been destaged.

27. The product according to claim 21, wherein the instructions cause the control unit to receive a dismiss command with respect to the specified range, and to discard the data in the specified range in the cache responsively to the dismiss command.

28. The product according to claim 27, wherein the instructions cause the control unit to receive multiple standby commands, specifying multiple, respective ranges within which the destaging is to be inhibited, and to receive one or more dismiss commands dismissing a plurality of the ranges, and wherein instructions further cause the control unit to maintain a list of invalid ranges, and to remove each invalid range from the list after all the data in the invalid range have been overwritten or invalidated.

29. The product according to claim 27, wherein the standby command specifies a point in time at which inhibition of the destaging is to begin, and wherein the instructions cause the control unit, responsively to the dismiss command, to discard from the cache the data written to the storage system since the specified point in time so as to restore the data within at least an extent in the storage system to a state held prior to the point in time.

30. The product according to claim 21, wherein the instructions cause the control unit to receive at least first and second requests to write the data to locations in the specified range while the destaging of the data is inhibited, and to write the data to the cache responsively to the first request until the cache is full, and when the cache is full, to write the data to an overflow region of the mass storage device responsively to the second request.

* * * * *